H. E. VAN NESS & W. T. KNEALE.
COASTER BRAKE.
APPLICATION FILED DEC. 23, 1911.
1,041,914.
Patented Oct. 22, 1912
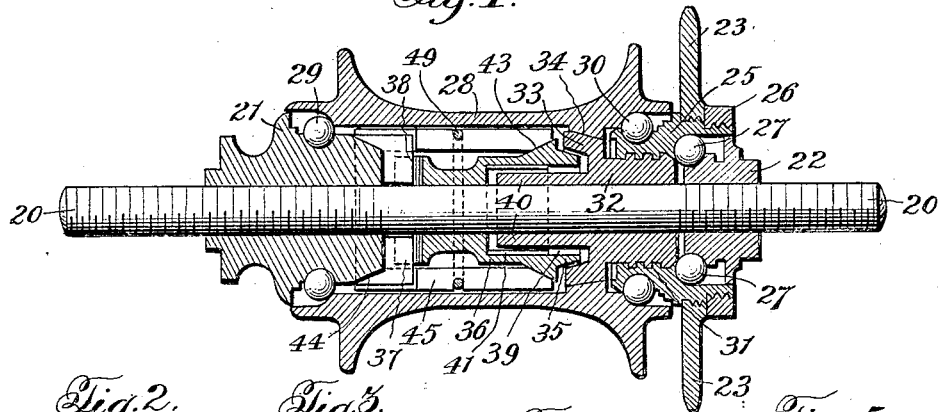
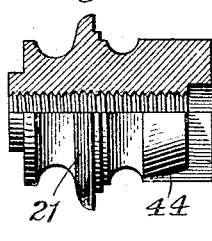
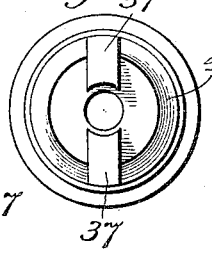
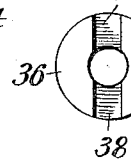
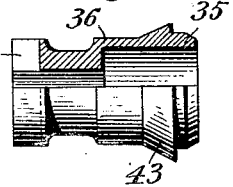
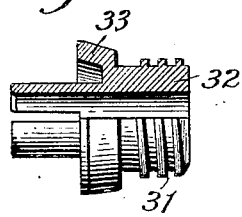
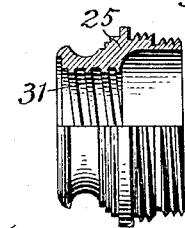
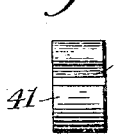
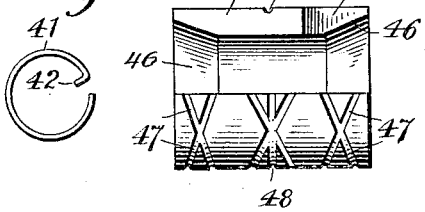
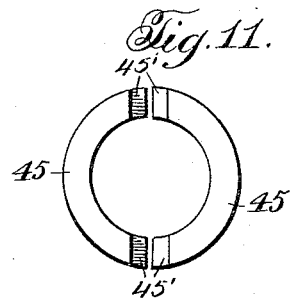
Witnesses:
Jas E. Hutchinson
Blu Kent
Inventors
H. E. Van Ness
W. T. Kneale
By Foster Freeman Watson & Co't Attorneys

UNITED STATES PATENT OFFICE.

HENRY E. VAN NESS AND WILLIAM T. KNEALE, OF ELMIRA, NEW YORK.

COASTER-BRAKE.

1,041,914.  Specification of Letters Patent.  Patented Oct. 22, 1912.

Application filed December 23, 1911. Serial No. 667,481.

*To all whom it may concern:*

Be it known that we, HENRY E. VAN NESS and WILLIAM T. KNEALE, citizens of the United States, residing at Elmira, county of Chemung, and State of New York, have invented certain new and useful Improvements in Coaster-Brakes, of which the following is a specification.

This invention relates to coaster brakes for bicycles, etc., and has for its object the construction of a brake which will be simple and very effective in action and which will also have relatively few parts subjected to excessive wear and the wearing parts of which will be so arranged that the wear will be uniform.

The novel features of the invention will be apparent from the following description, taken in connection with the accompanying drawings, in which, Figure 1 is a longitudinal cross section of the invention and Figs. 2 to 11 show detailed views of the various parts of the invention.

Referring to the drawings, it will be seen that the invention comprises the usual axle 20, which is screw-threaded at both ends to receive the ball-bearing cones 21 and 22. A sprocket wheel 23 is secured to a sleeve 24, as by means of the screw-threads 25 and the lock-nut 26. The sleeve 24 is rotatably mounted on the cone 22 by means of the ball-bearing 27. A wheel-hub 28 is rotatably mounted on the bearing cone 21 and the sleeve 24 by means of the ball-bearings 29 and 30 respectively. The sleeve 24 is interiorly screw-threaded as at 31 the threads thereof being in engagement with corresponding external threads on one end of the sleeve 32, which is rotatably mounted on the axle 20. The sleeve 32 is provided with a conical flange 33 which is adapted to engage a conical surface 34 on the interior of the hub 28. The interior of the flange 33 is also conically formed to engage the outer conical surface at the end 35 of the sleeve 36. The sleeve 36 is mounted on the axle 20 between the sleeve 32 and the bearing-cone 21, and is prevented from rotating thereon by the projections 37 on the inner end of cone which engage suitable recesses 38. The sleeve 36 is provided with an annular recess 39 which receives the extension 40 on the sleeve 32, this extension being of somewhat smaller diameter than the recess 39, whereby an annular space is provided for a spring slip-ring 41, which has an inwardly turned end 42 engaging a suitable slot in the extension 40, whereby the ring rotates with the sleeve 32.

The ring 41 tends to expand so as to engage the sleeve 36. The sleeve 36 is also provided with an external conical surface 43 and the cone 21 has on its inner end a similar surface 44, oppositely arranged with respect to the surface 43. The surface 44, however, is divided into two parts by the projections 37 above referred to. Semi-circular brake members or sleeves 45 are provided with interior conical surfaces 46 which are adapted to coöperate with the surfaces 43 and 44. The sleeves 45 are also provided with the end notches 45′ which receive the projections 37 on the cone 21 and prevent the sleeves from rotating. The outer cylindrical surface of the members 45 is provided with suitable grooves 47 to receive and distribute a lubricant and also have grooves 48, which receive a spring 49 which tends to hold the brake members together.

It will be observed from Fig. 1 that the outer diameter of the members 45 is slightly smaller than the internal diameter of the hub whereby these members are adapted to engage the inner surface of the hub when they are separated.

The operation of the parts above described is as follows: In normal driving the sleeve 32 is drawn to its outward limit where the flange 33 engages the conical surface 34 of the hub, by means of the screw-threads 31. When the sprocket-wheel 23 is given a backward rotation, the sleeve 32 will be moved inwardly until the flange 33 engages the extension 35 on the sleeve 36 and thus disengaged from the hub 28. As the sleeve 32 continues to move inwardly the brake members 45 will be separated as the conical surfaces 43 and 44 are made to approach each other. In this way the brake members 45 are pressed against the interior of the hub 28 and as the brake members are held stationary by the projections 37 on the cone 21, there will be a retardation of the hub. When the sprocket-wheel is rotated forwardly again the sleeve 32 will be moved outwardly until the flange 33 engages the conical surface 34 and thereby drive the hub 28 and the spring 49 will draw the brake members out of contact with the interior of the hub.

In order to cause the sleeve 32 to rotate relatively to the sprocket-wheel, the slip-ring 41 is provided, this ring tending to hold the sleeve 32 stationary as the sprocket wheel is turned, owing to the frictional engagement between the ring and the sleeve 36. As thus constructed, it will be seen that both the cone 21 and the sleeve 36 are always stationary except for the axial movement of the latter, and therefore there is no relative rotation between either of these parts and the brake members 45 so that the only wear to which the surfaces 43, 44 and 46 are subjected is that due to the sliding of one part relatively to another. In a device of this kind this wear would be inappreciable as compared with the wear between the outer surface of the brake members 45 and the interior of the hub 28, so that both ends of the members 45 will always be uniformly moved outwardly and there will be uniform braking action over the entire surface of the brake members.

In accordance with the provisions of the patent statutes we have described the principles of our invention and also the preferred form thereof, but it will be understood that various changes may be made in the details thereof without departing from the spirit of the invention, as defined in the following claims.

Having thus described our invention what we claim is:

1. In a coaster brake, the combination of a stationary member, a driving member, a driven member, a non-rotatable axially movable sleeve provided with an inclined surface, a corresponding inclined surface on said stationary member, a member engaging said inclined surfaces and arranged to be pressed against the interior of the driven member by an axial movement of said sleeve, means for connecting said driving and driven members and for moving said sleeve axially, and frictional means for preventing said last-mentioned means from rotating with the driving member when disconnected from the driven member.

2. In a coaster brake, the combination of a stationary axle, a member on one end of the axle provided with an inclined surface, a longitudinally movable sleeve carried by the axle and held against rotation thereon and provided with an inclined surface, a driving member on the other end of the axle, a hub rotatably mounted on said members, a member arranged within the hub and engaging said inclined surfaces and adapted to be moved into engagement with the hub by moving said sleeve, a member coöperating with the driving member for moving said sleeve, and adapted to connect said driving and driven members, and frictional means for preventing said last mentioned member from rotating with the driving member when disconnected from the driven member.

3. In a coaster brake, the combination of a stationary axle, bearing-cones on said axle, one of said cones having an inclined surface at its inner end, a driving member rotatably mounted on the other of said cones, a driven member rotatably mounted on the driving member and one of said cones, a non-rotatable member arranged between said cones and provided with an inclined surface, a member engaging said inclined surfaces and adapted to be moved radially into contact with said driven member, and means having frictional connection with a non-rotatable part and adapted to connect said non-rotatable member with said driving member or said driven member with said driving member.

4. In a coaster brake, the combination of a stationary axle, a driving member, a driven member, a brake member arranged within said driven member and provided with oppositely arranged inclined surfaces, non-rotatable members having inclined surfaces engaging the inclined surfaces on said brake member, one of said non-rotatable members being axially movable to press said brake member against the interior surface of said driven member, and means having frictional connection with a non-rotatable part and adapted to be moved axially by the driving member into engagement with said axially movable member or said driven member.

5. In a coaster brake, the combination of a stationary axle, a driving member, a driven member, a plurality of brake members arranged within said driven member and provided with oppositely arranged inclined surfaces, non-rotatable members having interlocking means and inclined surfaces engaging the inclined surfaces on said brake members, one of said non-rotatable members being axially movable to press said brake members against the interior surface of the driven member, a rotatably mounted member having means adapted to coöperate with the driven member to drive the latter and said member being also adapted to be moved axially to move said axially movable member, frictional means connecting said rotatably mounted member with a non-rotatable part, and cam means connecting said rotatable member and the driving member whereby the former is moved axially by the latter.

6. In a coaster brake, the combination of a stationary axle, a driving member, a hub, brake members arranged within the hub and adapted to engage the inner surface thereof, non-rotatable members mounted on the axle and having inclined surfaces coöperating with corresponding surfaces on the brake members so that the latter are moved into engagement with said hub by moving one of the non-rotatable members axially, spring means for moving the brake members out of engagement with the hub, an axially movable rotatable sleeve having a screw-thread connection with the driving member and means adapted to coöperate with the hub to drive the latter, and a connection between said axially movable member and said sleeve adapted to permit relative rotation of these parts.

7. In a coaster brake, the combination of a stationary axle, a pair of bearing cones thereon, a driving member mounted on one of said cones, a hub rotatably mounted on the driving member and the other of said cones, a non-rotatable axially movable sleeve having an inwardly converging conical surface, said other cone having a conical surface oppositely arranged with respect to said first-mentioned surface, a cylindrical brake member engaging said conical surfaces and adapted to engage the inner surface of the hub, an axially movable rotatable sleeve having means for engaging the hub to drive the latter and a screw-thread connection with the driving member, and a slip-ring connecting said axially movable members together.

In testimony whereof we affix our signatures in presence of two witnesses.

HENRY E. VAN NESS.
WILLIAM T. KNEALE.

Witnesses:
A. S. DIVEN,
LEWIS HENRY.

---

Copies of this patent may be obtained for five cents each, by addressing the "Commissioner of Patents. Washington, D. C."